United States Patent
Lai

(10) Patent No.: US 8,405,625 B2
(45) Date of Patent: Mar. 26, 2013

(54) METHOD FOR DETECTING TRACKS OF TOUCH INPUTS ON TOUCH-SENSITIVE PANEL AND RELATED COMPUTER PROGRAM PRODUCT AND ELECTRONIC APPARATUS USING THE SAME

(75) Inventor: Ming-Te Lai, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 595 days.

(21) Appl. No.: 12/622,440

(22) Filed: Nov. 20, 2009

(65) Prior Publication Data

US 2011/0032194 A1 Feb. 10, 2011

(30) Foreign Application Priority Data

Aug. 6, 2009 (TW) .............................. 98126521 A

(51) Int. Cl.
G06F 3/041 (2006.01)
(52) U.S. Cl. .................................. 345/173; 345/156
(58) Field of Classification Search .................. None
See application file for complete search history.

(56) References Cited

U.S. PATENT DOCUMENTS

| | | | | |
|---|---|---|---|---|
| 6,040,824 | A * | 3/2000 | Maekawa et al. | 345/173 |
| 6,049,326 | A * | 4/2000 | Beyda et al. | 345/157 |
| 7,138,983 | B2 * | 11/2006 | Wakai et al. | 345/173 |
| 7,843,427 | B2 * | 11/2010 | Ording et al. | 345/157 |
| 7,982,723 | B2 * | 7/2011 | Ningrat | 345/174 |
| 8,294,669 | B2 * | 10/2012 | Partridge et al. | 345/157 |
| 2002/0036618 | A1 | 3/2002 | Wakai | |
| 2002/0145595 | A1 * | 10/2002 | Satoh | 345/173 |
| 2006/0232567 | A1 | 10/2006 | Westerman | |
| 2007/0268269 | A1 * | 11/2007 | Chang et al. | 345/173 |
| 2008/0263445 | A1 * | 10/2008 | Park | 715/702 |
| 2009/0066643 | A1 * | 3/2009 | Im | 345/157 |
| 2009/0066662 | A1 * | 3/2009 | Liu et al. | 345/173 |
| 2009/0207144 | A1 * | 8/2009 | Bridger | 345/173 |
| 2009/0309847 | A1 * | 12/2009 | Russell et al. | 345/173 |
| 2010/0097342 | A1 * | 4/2010 | Simmons et al. | 345/174 |
| 2011/0239155 | A1 * | 9/2011 | Christie | 715/784 |

* cited by examiner

*Primary Examiner* — Dismery Mercedes
(74) *Attorney, Agent, or Firm* — Winston Hsu; Scott Margo

(57) ABSTRACT

A method for detecting tracks of touch inputs on touch-sensitive panel, which is applied for an electronic apparatus having a touch-sensitive panel, comprises: during a first period, detecting M touch positions of M touch inputs on the touch-sensitive panel; during a second period, detecting N touch positions of N touch inputs on the touch-sensitive panel, where M and N are positive integers and M is less than or equal to N; selecting a specific touch input from the M touch inputs, where the specific touch input corresponds to a specific touch position of the M touch positions; and determining a track of the specific touch input on the touch-sensitive panel according to N distances that are between the specific touch position and the N touch positions respectively.

16 Claims, 11 Drawing Sheets

METHOD FOR DETECTING TRACKS OF TOUCH INPUTS ON TOUCH-SENSITIVE PANEL AND RELATED COMPUTER PROGRAM PRODUCT AND ELECTRONIC APPARATUS USING THE SAME

BACKGROUND OF THE INVENTION

1. Field of the Invention

The present invention relates to a method for detecting tracks of touch inputs on a touch-sensitive panel, and more particularly, to a method for detecting tracks of multi-touch inputs on the touch-sensitive panel in order to accurately determine operating gestures of users.

2. Description of the Prior Art

As for a traditional capacitive touch-sensitive panel or an optical touch-sensitive panel, its processor detects touch inputs on the touch-sensitive panel based on a predetermined scanning sequence. When a touch input is detected, the processor stores the corresponding coordinate value of the position of the touch input located on the touch-sensitive panel into an array of a memory. For example, assume that the processor scans the touch inputs of the whole touch-sensitive panel row-by-row from the upper-left to the lower-right of the touch-sensitive panel. As a result, the corresponding coordinate value of a first scanned touch input is recorded into a first position of the array, the corresponding coordinate value of a second scanned touch input is recorded into a second position of the array, and so on.

However, since the sequence for storing the coordinate values of the array is determined according to the detected sequence of the corresponding touch inputs on the touch-sensitive panel, the processor may make wrong judgments for some specific gestures when the user utilizes multiple fingers moved on the touch-sensitive panel. As an illustration, please refer to FIG. 1. FIG. 1 (including (1a) and (1b)) is a diagram showing a user uses his thumb and index finger to make a rotation track on a touch-sensitive panel 100. First, as (1a) of FIG. 1 depicts, assume that the processor scans the touch inputs of the whole touch-sensitive panel 100 row-by-row from the upper-left to the lower-right of the touch-sensitive panel 100. Therefore, a first position of an array 110 is used for recording the coordinate value P1 corresponding to the position of the thumb on the touch-sensitive panel 100, and a second position of the array 110 is used for recording the coordinate value P2 corresponding to the position of the index finger on the touch-sensitive panel 100. Afterwards, as (1b) of FIG. 1 depicts, when the user uses his thumb and index finger to make a rotation track along the dotted line on a touch-sensitive panel 100, such that the thumb and the index finger of the user are moved to the positions shown in (1b). At this time, a first position of an array 120 is used for recording the coordinate value P2' corresponding to the position of the index finger on the touch-sensitive panel 100, and a second position of the array 120 is used for recording the coordinate value P1' corresponding to the position of the thumb on the touch-sensitive panel 100. Since the processor determines the tracks of the touch inputs by reference to the positions of the arrays, the processor may erroneously determines that the coordinate value P2' recorded in the first position of the array 120 corresponds to the coordinate value of the thumb (actually, it should correspond to the coordinate value of the index finger), and the processor may erroneously determines that the coordinate value P1' recorded in the second position of the array 120 corresponds to the coordinate value of the index finger (actually, it should correspond to the coordinate value of the thumb). For these reasons, the processor may erroneously determine the tracks of the user's fingers on the touch-sensitive panel 100, and is unable to accurately determine operating gestures of the user.

SUMMARY OF THE INVENTION

It is one of the objectives of the claimed invention to provide a method for detecting tracks of multi-touch inputs on a touch-sensitive panel, in order to accurately determine operating gestures of users for solving the abovementioned problems.

According to one embodiment, a method for detecting tracks of touch inputs on touch-sensitive panel is provided. The method is applied to an electronic apparatus having a touch-sensitive panel, and the method comprises the steps of: during a first period, detecting M touch positions of M touch inputs on the touch-sensitive panel; during a second period, detecting N touch positions of N touch inputs on the touch-sensitive panel, wherein M and N are positive integers and M is less than or equal to N; selecting a specific touch input from the M touch inputs, wherein the specific touch input corresponds to a specific touch position of the M touch positions; and determining a track of the specific touch input on the touch-sensitive panel according to N distances that are between the specific touch position and the N touch positions respectively.

According to another embodiment, an electronic apparatus is provided. The electronic apparatus includes a touch-sensitive panel and a processor. The processor is used for detecting M touch positions of M touch inputs on the touch-sensitive panel during a first period, and for detecting N touch positions of N touch inputs on the touch-sensitive panel during a second period, wherein M and N are positive integers and M is less than or equal to N; the processor is further used for selecting a specific touch input from the M touch inputs, wherein the specific touch input corresponds to a specific touch position of the M touch positions; and the processor is further used for determining a track of the specific touch input on the touch-sensitive panel according to N distances that are between the specific touch position and the N touch positions respectively.

According to another embodiment, a computer program product is provided. The computer product has program instructions used for executing the following steps: during a first period, detecting M touch positions of M touch inputs on the touch-sensitive panel; during a second period, detecting N touch positions of N touch inputs on the touch-sensitive panel, wherein M and N are positive integers and M is less than or equal to N; selecting a specific touch input from the M touch inputs, wherein the specific touch input corresponds to a specific touch position of the M touch positions; and determining a track of the specific touch input on the touch-sensitive panel according to N distances that are between the specific touch position and the N touch positions respectively.

According to another embodiment, an apparatus for detecting tracks of touch inputs on a touch-sensitive panel is provided. The apparatus includes a first means for detecting M touch positions of M touch inputs on the touch-sensitive panel during a first period, and for detecting N touch positions of N touch inputs on the touch-sensitive panel during a second period, wherein M and N are positive integers and M is less than or equal to N; a second means for selecting a specific touch input from the M touch inputs, wherein the specific touch input corresponds to a specific touch position of the M touch positions; and a third means for determining a track of the specific touch input on the touch-sensitive panel according to N distances that are between the specific touch position and the N touch positions respectively.

By reference to the electronic apparatus and the method for detecting tracks of touch inputs on a touch-sensitive panel disclosed in the present invention, the electronic apparatus is capable of accurately determining tracks of these fingers of the user on the touch-sensitive panel when the user uses several fingers to operate the electronic apparatus, such that it can accurately determine operating gestures of the user.

These and other objectives of the present invention will no doubt become obvious to those of ordinary skill in the art after reading the following detailed description of the preferred embodiment that is illustrated in the various figures and drawings.

DETAILED DESCRIPTION

A method for detecting tracks of touch inputs on a touch-sensitive panel, and a related computer program product and electronic apparatus using the same is disclosed in the present invention. The method makes uses of comparing distances that are between a specific touch input in one period having a smaller number of touch inputs among two consecutive periods and all touch inputs in another period having a larger number of touch inputs among the two consecutive periods, so as to determine tracks of the touch inputs on the touch-sensitive panel in order to accurately determine operating gestures of users.

Figure 1:
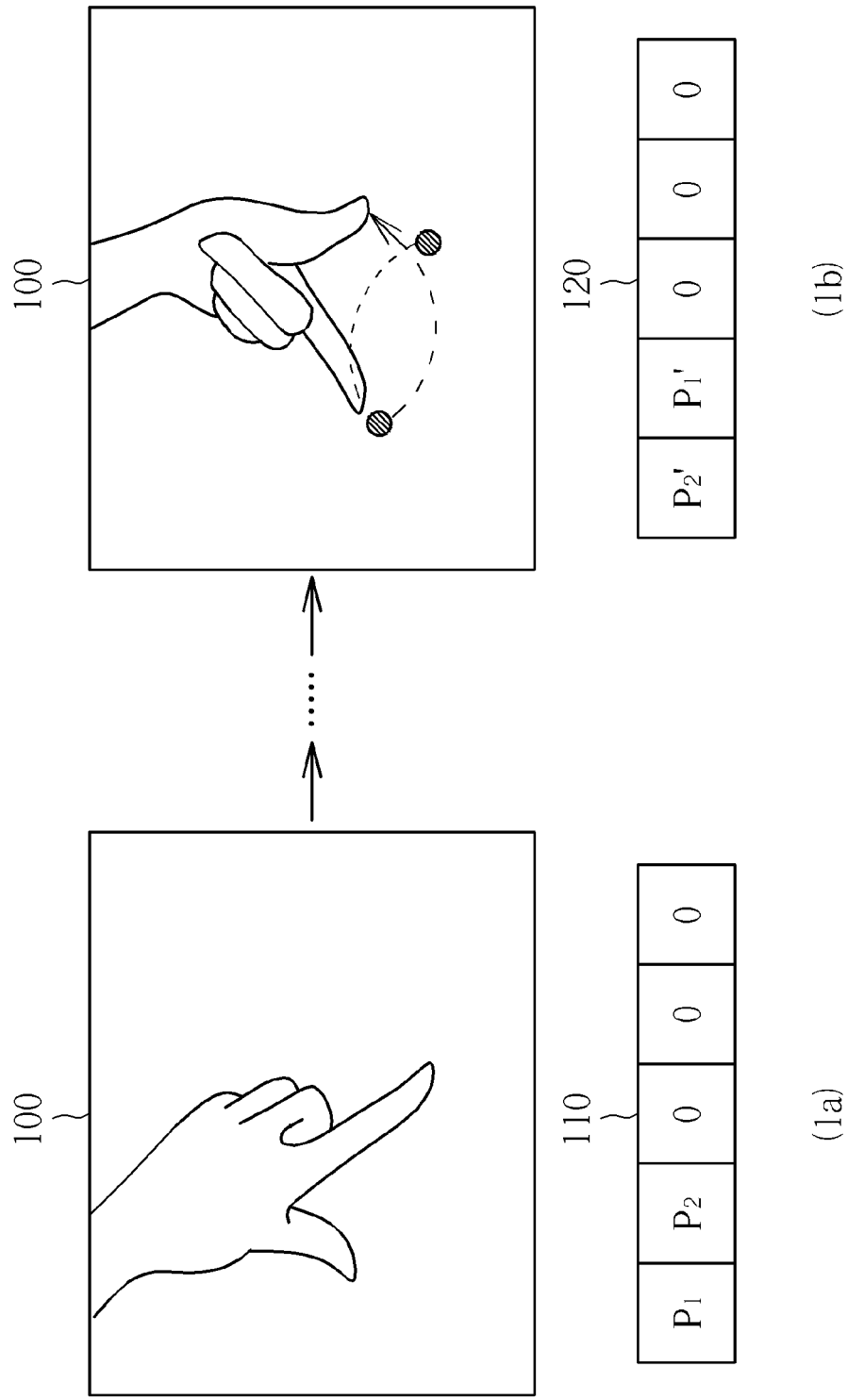
FIG. 1 (including (1a) and (1b)) is a diagram showing a user uses his thumb and index finger to make a rotation track on a touch-sensitive panel.
Figure 2:
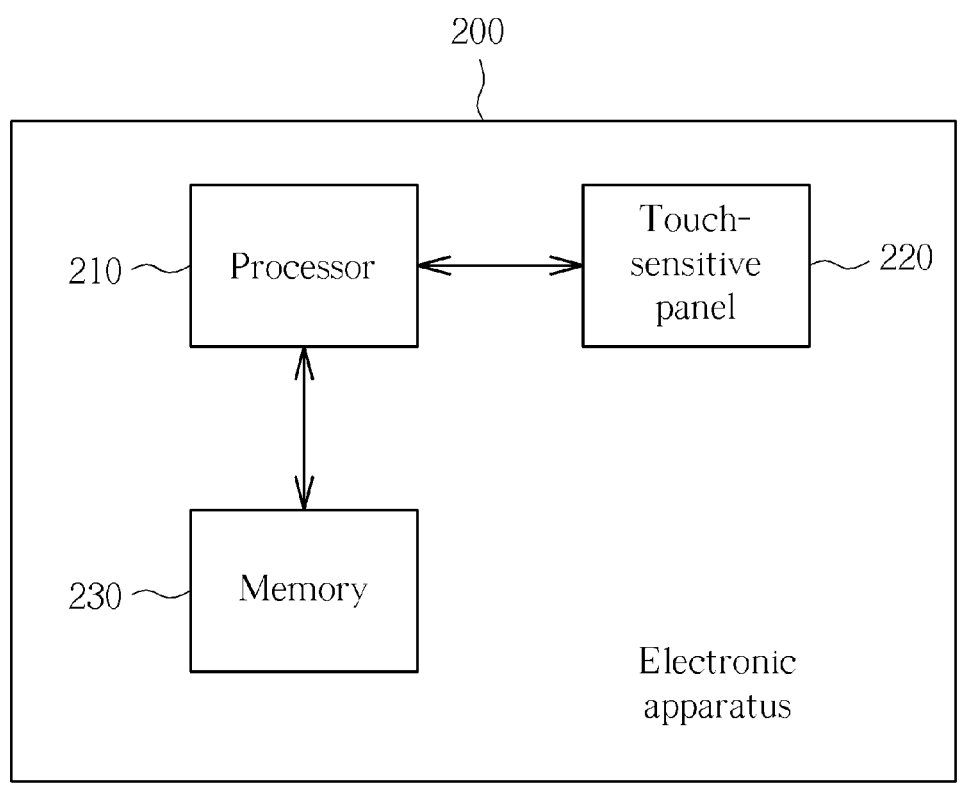
FIG. 2 is a diagram of an electronic apparatus according to an embodiment of the present invention.
Figure 3:
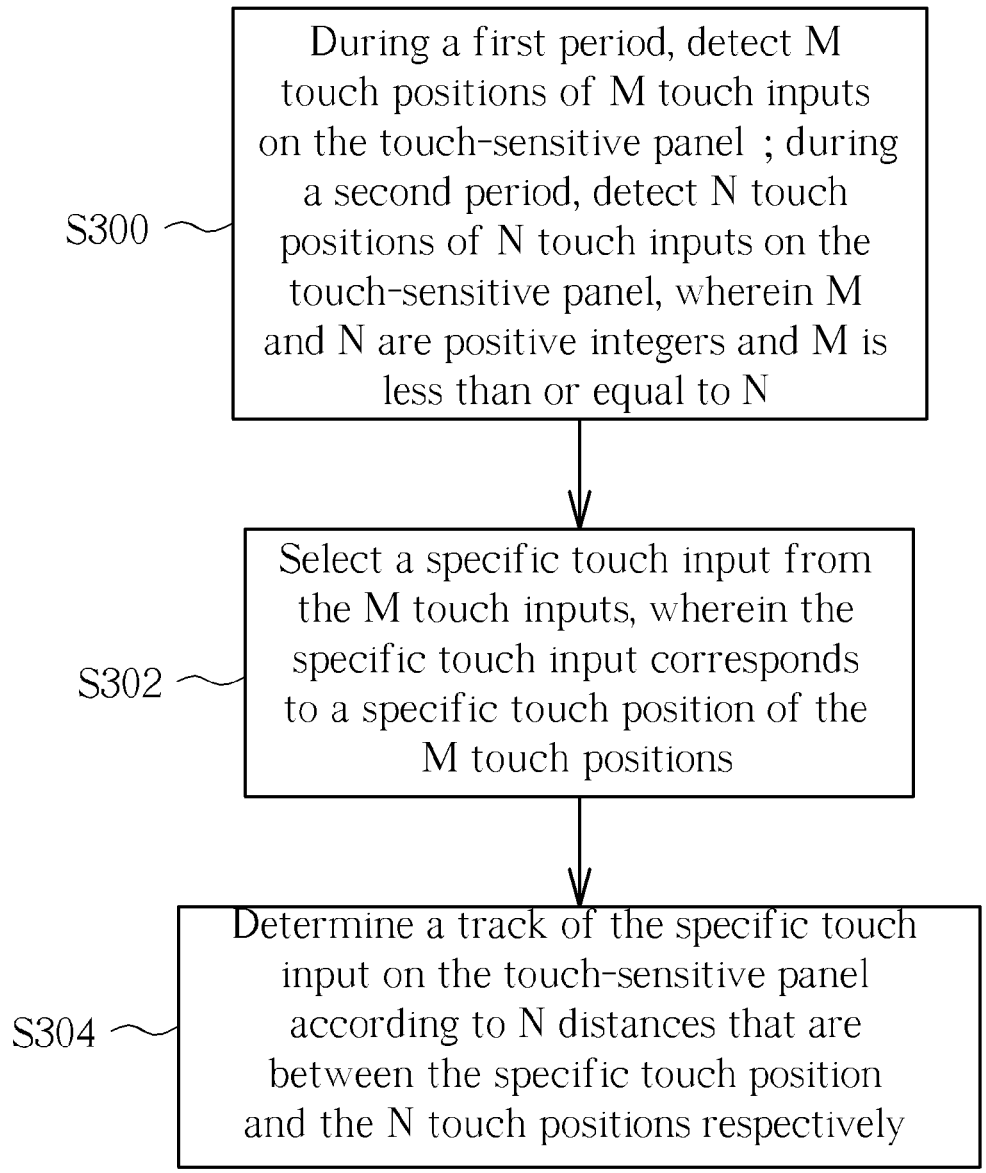
FIG. 3 is flowchart illustrating a method for detecting tracks of touch inputs on a touch-sensitive panel according to an exemplary embodiment of the present invention.

Please refer to FIG. 2 together with FIG. 3. FIG. 2 is a diagram of an electronic apparatus 200 according to an embodiment of the present invention. As FIG. 2 depicts, the electronic apparatus 200 includes a processor 210, a touch-sensitive panel 220, and a memory 230. FIG. 3 is flowchart illustrating a method for detecting tracks of touch inputs on the touch-sensitive panel 220 according to an exemplary embodiment of the present invention. Please note that the following steps of the method for detecting tracks of touch inputs on the touch-sensitive panel 220 are not limited to be performed according to the exact sequence shown in FIG. 3 if a roughly identical result can be obtained. The descriptions of the steps shown in FIG. 3 are listed as below:

First, in the step S300, the processor 210 detects M touch positions of M touch inputs on the touch-sensitive panel 220 during a first period, and detects N touch positions of N touch inputs on the touch-sensitive panel 220 during a second period, wherein M and N are positive integers and M is less than or equal to N. After that, in the step S302, the processor 210 selects a specific touch input from the M touch inputs, wherein the specific touch input corresponds to a specific touch position of the M touch positions. Finally, in the step S304, the processor 210 determines a track of the specific touch input on the touch-sensitive panel 220 according to N distances that are between the specific touch position and the N touch positions respectively. In the following descriptions, several examples are used for illustrating how to determine the tracks of the touch inputs on the touch-sensitive panel 220 by reference to the abovementioned method under a first condition that a number of the touch inputs increases (i.e., the first period is earlier than the second period) and under a second condition that the number of the touch inputs decreases (i.e., the first period is later than the second period).

Figure 4:
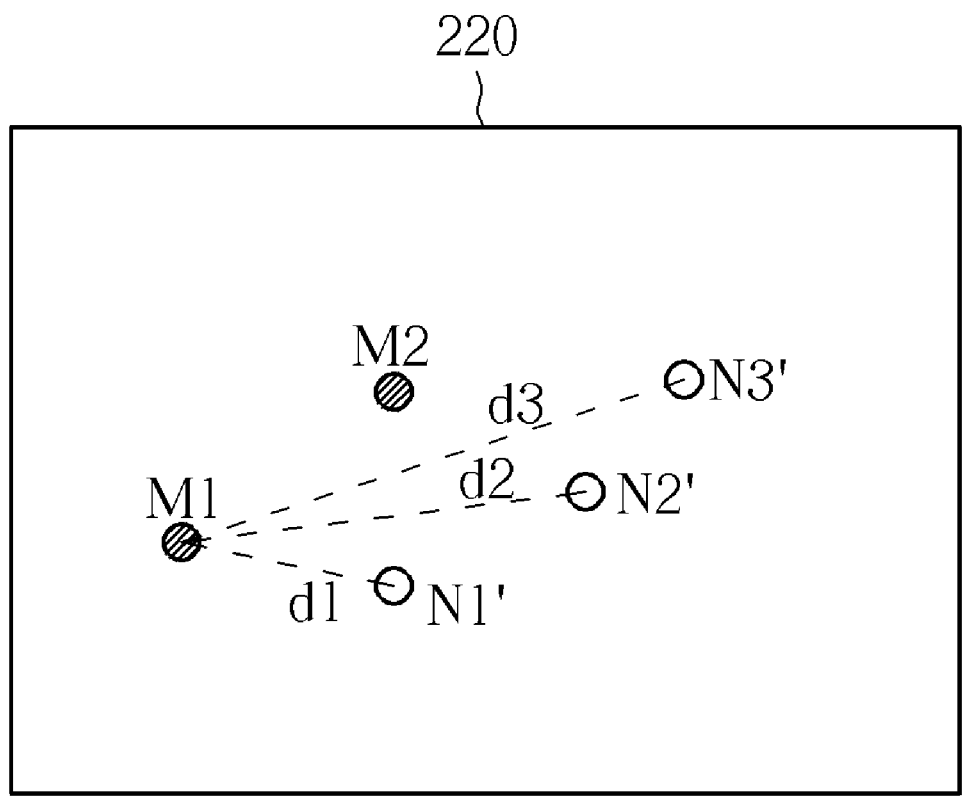
FIG. 4 is a diagram showing touch inputs on the touch-sensitive panel according to an exemplary embodiment of the present invention.

As an illustration, please refer to FIG. 2, FIG. 3, together with FIG. 4. FIG. 4 is a diagram showing a condition that the number of the touch inputs on the touch-sensitive panel 220 increases (i.e., the first period is earlier than the second period) according to an exemplary embodiment of the present invention. In the step S300, the processor 210 first detects that there are two touch inputs respectively located on touch positions M1 and M2 of the touch-sensitive panel 220 during a first period, and the processor 210 then detects that there are three touch inputs respectively located on touch positions N1', N2', and N3' of the touch-sensitive panel 220 during a second period. After that, in the step S302, the processor 210 selects a specific touch input from the two touch inputs detected during the first period. For example, the processor 210 selects the touch input located on the touch position M1 as a first specific touch input. Afterwards, in the step S304, the processor 210 compares the distances that are between the touch position M1 and these touch positions N1', N2', and N3' respectively (e.g., the distances d1, d2, and d3 shown in FIG. 4) so as to find out a nearest touch position of these touch positions N1', N2', and N3' that is closest to the touch position M1, such that a track of the first specific touch input on the touch-sensitive panel 220 can be determined. For example, from FIG. 4, we can see that N1' is the nearest touch position that is closest to the touch position M1. Accordingly, the processor 210 determines that the first specific touch input is moved from the touch position M1 to the touch position N1' on the touch-sensitive panel 220. Similarly, the processor 210 is able to select the touch input located on the touch position M2 as a second specific touch input, and determine that this second specific touch input is moved from the touch position M2 to the touch position N2'.

Furthermore, under the condition that the number of the touch inputs increases (i.e., the first period is earlier than the second period), after all the tracks of the touch inputs detected during the first period have completed judgments, the processor 210 can further determine which touch input(s) within the touch inputs detected during the second period is/are newly added on the touch-sensitive panel 220 according to this determining result. Continued from the abovementioned example, after determining that the first specific touch input is moved from the touch position M1 to the touch position N1' on the touch-sensitive panel 220 and that the second specific touch input is moved from the touch position M2 to the touch position N2' on the touch-sensitive panel 220, the processor 210 can accordingly determine that a third specific touch input T3 is newly added at the touch position N3' on the touch-sensitive panel 220.

Figure 5:
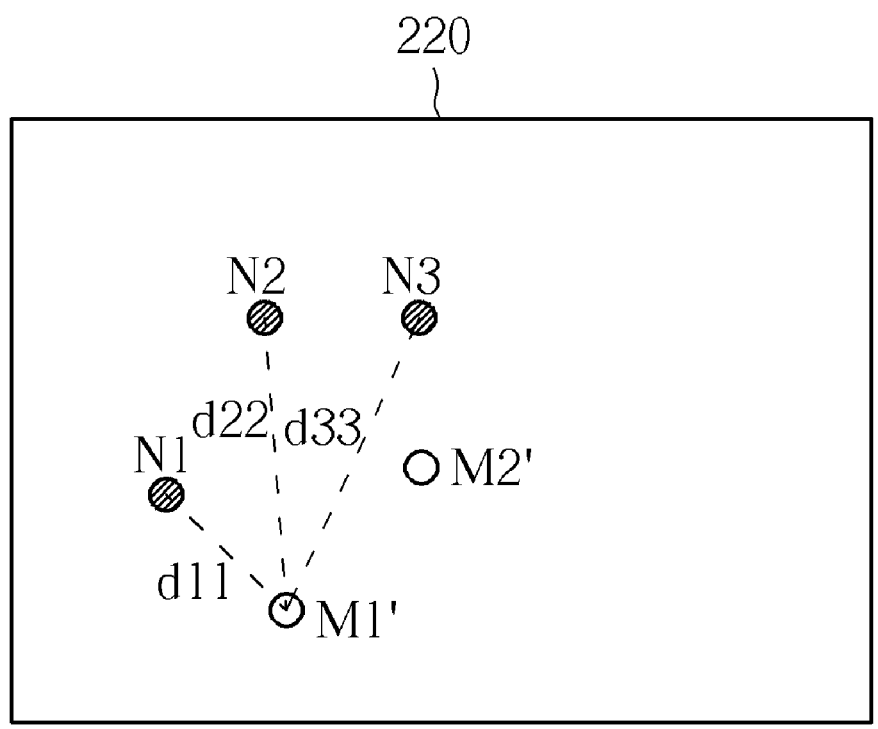
FIG. 5 is a diagram showing touch inputs on touch-sensitive panel according to another exemplary embodiment of the present invention.

As an illustration, please refer to FIG. 2, FIG. 3, together with FIG. 5. FIG. 5 is a diagram showing a condition that the number of the touch inputs on the touch-sensitive panel 220 decreases (i.e., the first period is later than the second period) according to another exemplary embodiment of the present invention. In the step S300, the processor 210 first detects that there are three touch inputs respectively located on touch positions N1, N2, and N3 of the touch-sensitive panel 220 during a second period, and the processor 210 then detects that there are two touch inputs respectively located on touch positions M1' and M2' of the touch-sensitive panel 220 during a first period. After that, in the step S302, the processor 210 selects a specific touch input from the two touch inputs detected during the first period. For example, the processor 210 selects the touch input located on the touch position M1' as a first specific touch input. Afterwards, in the step S304, the processor 210 compares the distances that are between the touch position M1' and these touch positions N1, N2, and N3 respectively (e.g., the distances d11, d22, and d33 shown in FIG. 5) so as to find out a nearest touch position of these touch positions N1, N2, and N3 that is closest to the touch position M1', such that a track of the first specific touch input on the touch-sensitive panel 220 can be determined. For example, from FIG. 5, we can see that N1 is the nearest touch position that is closest to the touch position M1'. Accordingly, the processor 210 determines that the first specific touch input is moved from the touch position N1 to the touch position M1' on the touch-sensitive panel 220. Similarly, the processor 210 is able to select the touch input located on the touch position M2' as a second specific touch input, and determines that this second specific touch input is moved from the touch position N3 to the touch position M2'.

Furthermore, under the condition that the number of the touch inputs decreases (i.e., the first period is later than the second period), after all the tracks of the touch inputs detected during the first period have completed judgments, the processor 210 can further determine which touch input(s) within the touch inputs detected during the second period is/are removed from the touch-sensitive panel 220 according to this determining result. Continued from the abovementioned example, after determining that the first specific touch input is moved from the touch position N1 to the touch position M1' on the touch-sensitive panel 220 and that the second specific touch input is moved from the touch position N3 to the touch position M2' on the touch-sensitive panel 220, the processor 210 can accordingly determine that a third specific touch input is removed from the touch position N2 on the touch-sensitive panel 220.

As mentioned above, the first embodiment shown in FIG. 4 is applied to the condition that the number of the touch inputs increases, while the second embodiment shown in FIG. 5 is applied to the condition that the number of the touch inputs decreases. However, if the number of the touch inputs during the first period is the same as that during the second period, any one of the abovementioned two embodiments can be used for determining the tracks of the touch inputs.

Figure 6:
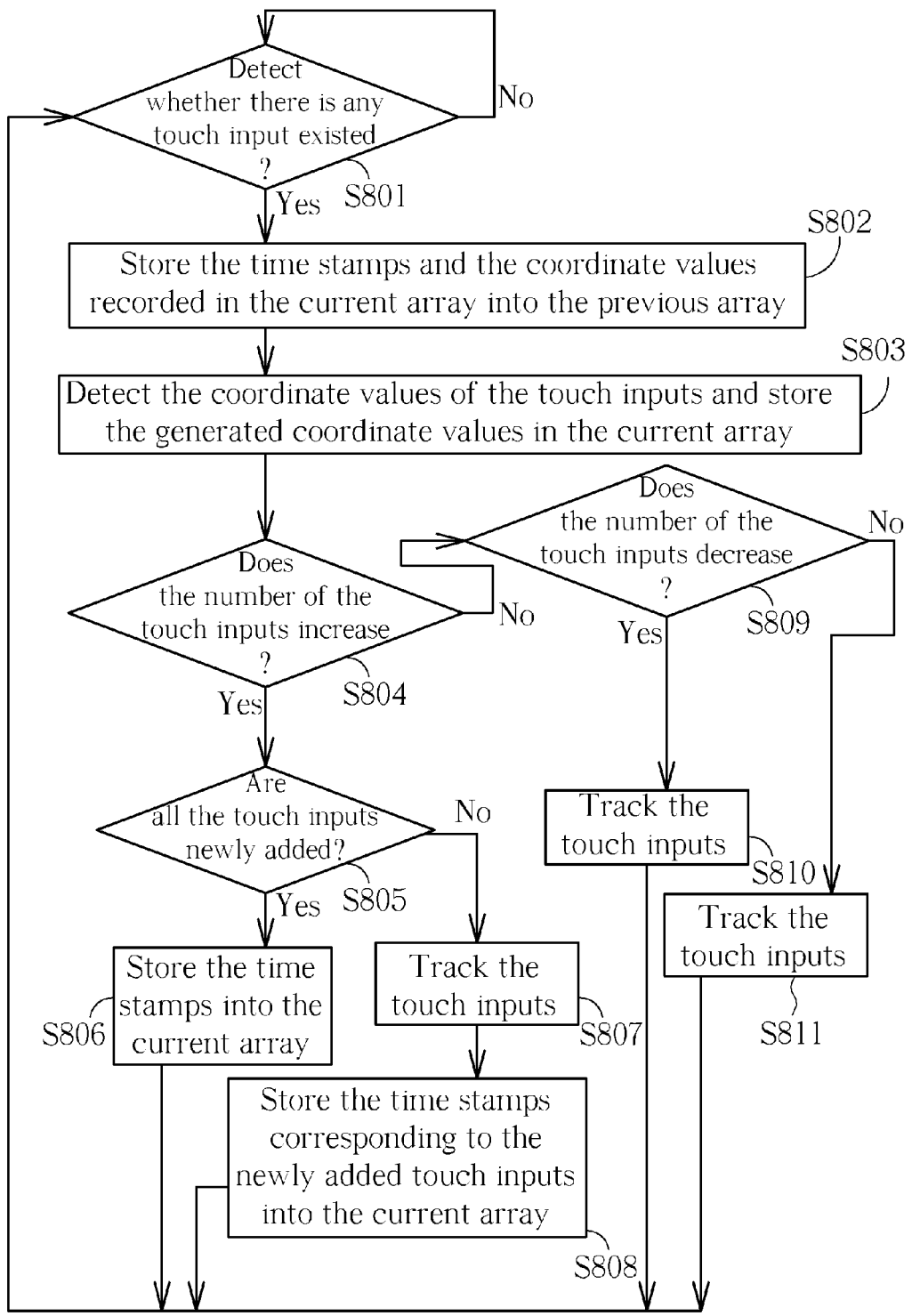
FIG. 6 is flowchart illustrating a method for detecting tracks of touch inputs on a touch-sensitive panel according to another exemplary embodiment of the present invention.

Please refer to FIG. 2 together with FIG. 6. FIG. 6 is a flowchart illustrating a method for detecting tracks of touch inputs on the touch-sensitive panel 220 according to another exemplary embodiment of the present invention. Please note that the following steps of the method for detecting tracks of touch inputs on the touch-sensitive panel 220 are not limited to be performed according to the exact sequence shown in FIG. 6 if a roughly identical result can be obtained. In the embodiment shown in FIG. 6, the memory 230 includes a current array Arr_Cur as well as a previous array Arr_Pre respectively used for storing coordinate values and their corresponding identifications of the touch inputs on the touch-sensitive panel 220 detected during a current period and a previous period. The descriptions of the steps shown in FIG. 6 are listed as below:

First, in the step S801, the processor 210 detects whether there is any touch input existed on the touch-sensitive panel 220. If it detects that there is no touch input existed on the touch-sensitive panel 220, keep on executing the step S801 at intervals of a fixed cycle in order to detect whether there is any touch input existed on the touch-sensitive panel 220; if it detects that there is touch input(s) existed on the touch-sensitive panel 220, go to the step S802.

In the step S802, the processor 210 first stores the data (e.g. the coordinate values and the identifications detected during the previous period) recorded in the current array Arr_Cur into the previous array Arr_Pre. After that, in the step S803, the processor 210 generates corresponding coordinate values of the touch positions of the touch inputs on the touch-sensitive panel 220, and then stores the generated coordinate values into the current array Arr_Cur, wherein a number of the generated coordinate values is the same as the number of the touch inputs.

Figure 7:
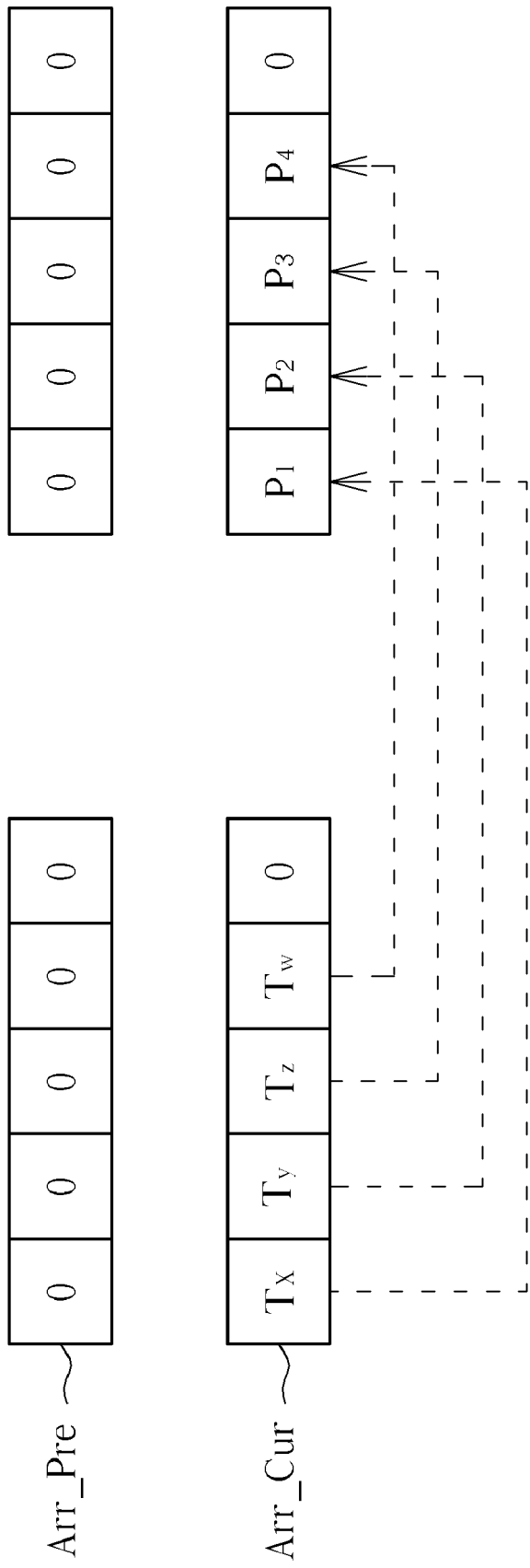
FIG. 7 is a diagram illustrating a previous array and a current array of a memory when the processor tracks the touch inputs according to an embodiment of the method shown in FIG. 6.

In the step S804, compared the number of the touch inputs detected by the processor 210 during the current period with that detected by the processor 210 during the previous period (that is, the number of the touch inputs recorded in the previous array Arr_Pre), the processor 210 will determine whether the number of the touch inputs detected during the current period (that is, the number of touch inputs recorded in the current array Arr_Cure) increases or not. If it is yes, go to the step S805. After that, in the step S805, the processor 210 determines whether all the touch inputs on the touch-sensitive panel 220 detected during the current period are newly added. That is to say, there is no touch input existed on the touch-sensitive panel 220 during the previous period. If it is yes, go to the step S806. Afterwards, in the step S806, the processor 210 assigns a corresponding identification to each coordinate value recorded in the current array Arr_Cur respectively, and stores the identifications into the corresponding positions of the coordinate values of the current array Arr_Cur, wherein each coordinate value corresponds to different identifications. As an illustration, please refer to FIG. 7. FIG. 7 is a diagram illustrating a previous array and a current array of a memory according to an embodiment of the method shown in FIG. 6. Assume that in the step S803, the processor 210 sequentially detects four touch inputs on the touch-sensitive panel 220 and correspondingly generates four coordinate values $P_1$, $P_2$, $P_3$, and $P_4$ to be recorded in the current array Arr_Cur; and in the step S805, the processor 210 determines that all of the four touch inputs are newly added. As a result, in the step S806, the processor 210 assigns four corresponding time stamps Tx, Ty, Tz, and Tw to the four coordinate values $P_1$, $P_2$, $P_3$, and $P_4$ respectively, and stores the four time stamps Tx, Ty, Tz, and Tw into the corresponding positions of the four coordinate values $P_1$, $P_2$, $P_3$, and $P_4$ respectively, wherein each of the time stamps Tx, Ty, Tz, and Tw is related to the time the corresponding touch input is newly added on the touch-sensitive panel 220. After that, return to the step S801.

Otherwise, in the step S805, if the processor 210 determines that not all the touch inputs on the touch-sensitive panel 220 detected during the current period are newly added (that is to say, there are touch inputs already existed on the touch-sensitive panel 220 during the previous period), go to the step S807.

Figure 8A:
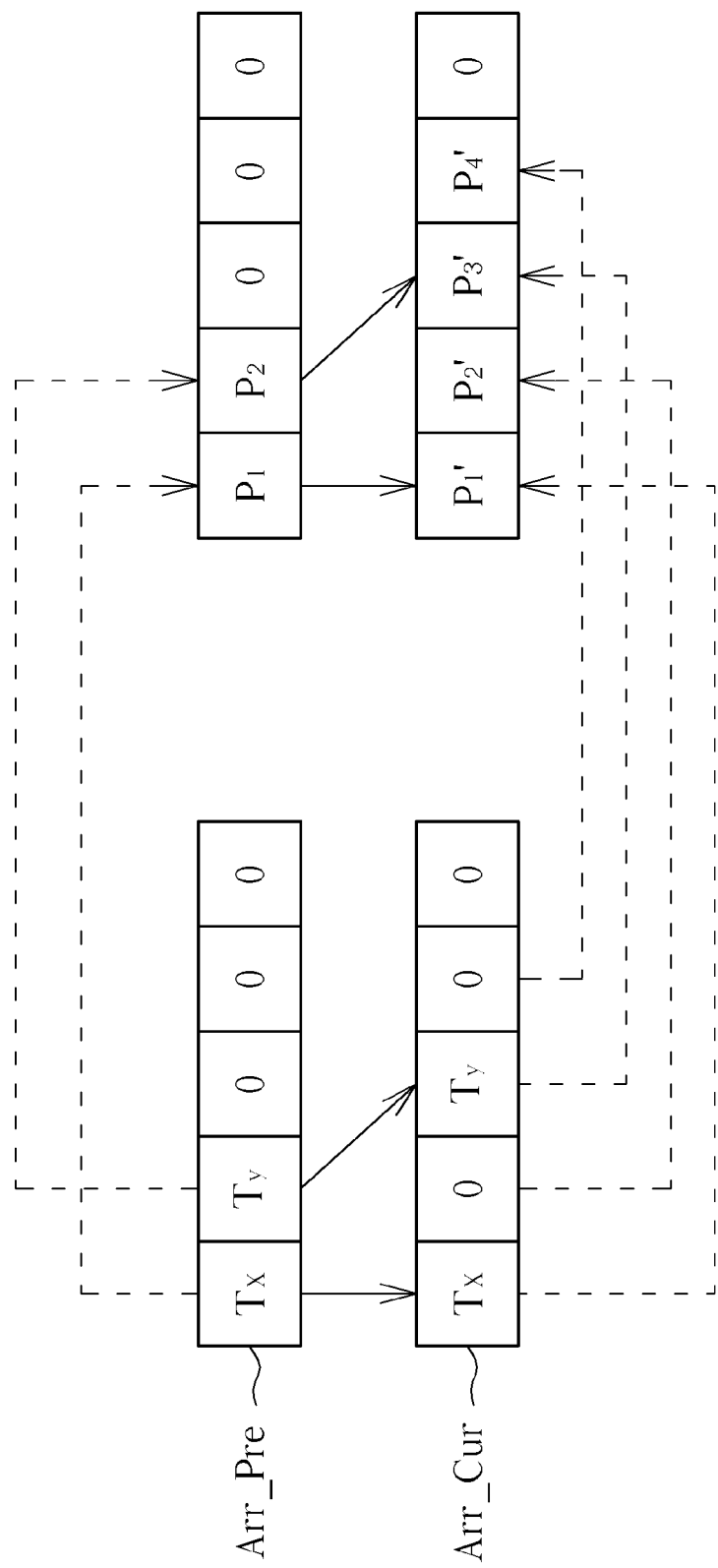
FIG. 8a and FIG. 8b are diagrams illustrating that the processor stores the time stamps into the current array of the memory according to an embodiment of the method shown in FIG. 6.
Figure 8B:
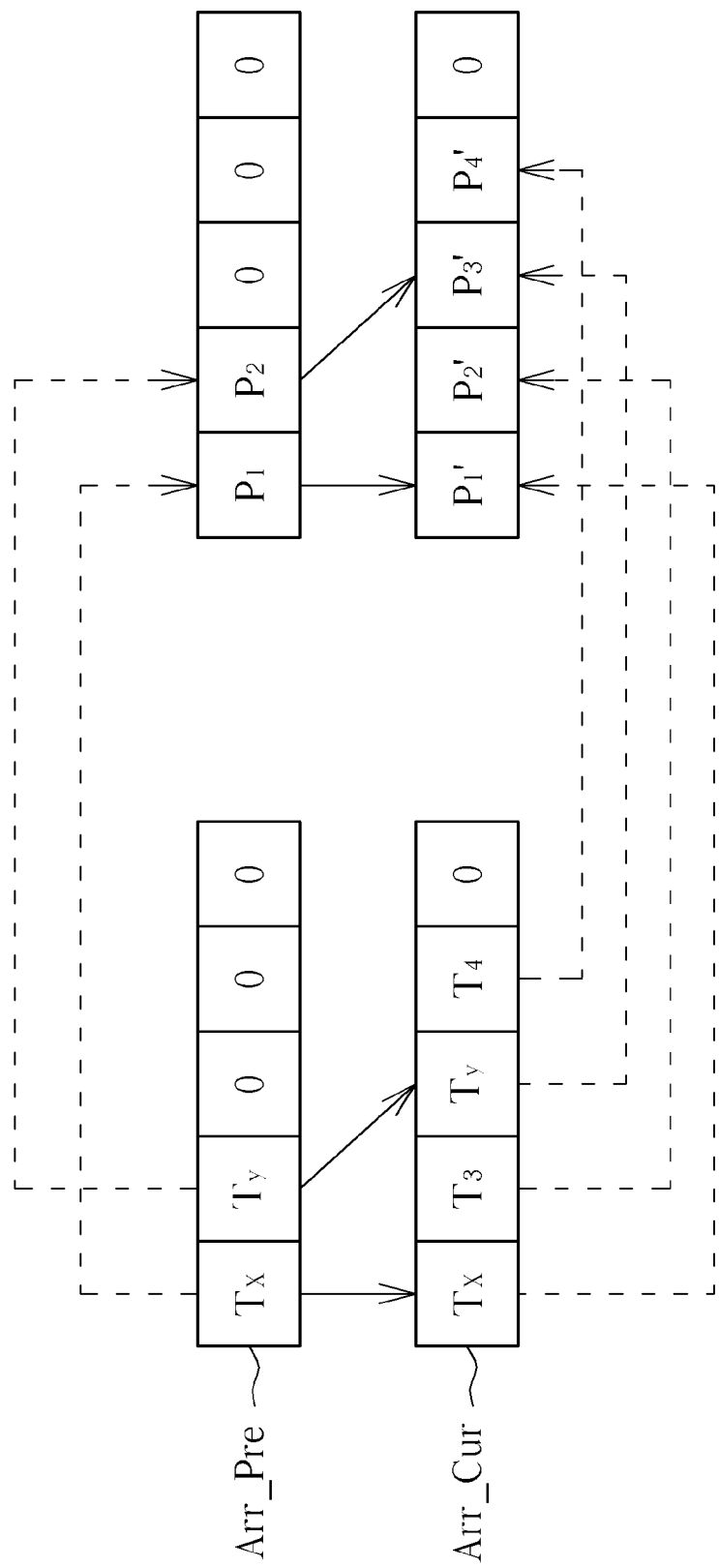

In the step S807, the processor 210 tracks the touch inputs so as to determine the tracks of the touch inputs. In more detail, by reference to the coordinate values recorded in previous array Arr_Pre and the current array Arr_Cur, the processor 210 is capable of determining which coordinate value (s) recorded in the current array Arr_Cur correspond(s) to the same touch object(s) (for example, a thumb of a user) of the coordinate value(s) recorded in the previous array Arr_Pre, and assigning the same identification(s) (for example, the time stamp(s)) of the corresponding coordinate value(s) recorded in the previous array Arr_Pre to the coordinate value(s) recorded in the current array Arr_Cur. Therefore, the processor 210 can determine the track of the touch input of the same touch object according to the time stamp and its two corresponding coordinate values generated during the previous period and the current period. As an illustration, please refer to FIG. 8*a* and FIG. 8*b*. FIG. 8*a* and FIG. 8*b* are diagrams illustrating a previous array and a current array of a memory according to an embodiment of the method shown in FIG. 6. Assume that the processor 210 sequentially detects two touch inputs on the touch-sensitive panel 220 during the previous period and correspondingly generates two coordinate values $P_1$ and $P_2$ as well as two time stamps Tx and Ty to be recorded in the previous array Arr_Pre of the memory 230; assume that the processor 210 sequentially detects four touch inputs on the touch-sensitive panel 220 during the current period and correspondingly generates four coordinate values P1', P2', P3', and P4' to be recorded in the current array Arr_Cur of the memory 230. The processor 210 first calculates the distances that are between the coordinate value P1 and these coordinate values P1', P2', P3', and P4', such that the shortest distance is found in order to determine a coordinate value which in accordance with the coordinate value P1 from these coordinate values P1'~P4'. The processor 210 copies the corresponding time stamp of the coordinate value P1 from the previous array Arr_Pre to be recorded into a corresponding position of the found coordinate value in the current array Arr_Cur. Assume that in this embodiment, the distance between the coordinate value P1 and the coordinate value P1' is the shortest. The processor 210 accordingly determines that the touch input located at the coordinate value P1 detected during the previous period corresponds to the same touch object (for example, a thumb of a user) of the touch input located at the coordinate value P1' detected during the current period, such that the time stamp Tx corresponding to the coordinate value P1 recorded in the previous array Arr_Pre is copied and recorded into the corresponding position of the coordinate value P1' in the current array Arr_Cur. In a similar way, the processor 210 then calculates the distances that are between the coordinate value P2 and these coordinate values P2', P3', and P4', such that the shortest distance is found in order to determine a coordinate value in accordance with the coordinate value P2 from these coordinate values P2'~P4'. The processor 210 stores the corresponding time stamp of the coordinate value P2 into the corresponding position of the found coordinate value in the current array Arr_Cur. Assume that in this embodiment, the distance between the coordinate value P2 and the coordinate value P3' is the shortest. The processor 210 accordingly determines that the touch input located at the coordinate value P2 detected during the previous period corresponds to the same touch object (for example, an index finger of a user) of the touch input located at the coordinate value P3' detected during the current period, such that the time stamp Ty corresponding to the coordinate value P2 recorded in the previous array Arr_Pre is copied and recorded into the corresponding position of the coordinate value P3' in the current array Arr_Cur.

Afterwards, in the step S808, the processor 210 can know that the two touch inputs located at the coordinate values P2' and P4' detected during the current period correspond to newly added touch objects by reference to the data recorded in the current array Arr_cur (as is shown in FIG. 8*a*). Therefore, the processor 210 assigns two time stamps T3 and T4 to these two coordinate values P2' and P4' respectively, and stores them into the corresponding positions of the coordinate values P2' and P4' in the current array Arr_Cur (as is shown in FIG. 8*b*). After that, go back to the step S801.

As a result, the processor 210 can know that a touch object (for example, a thumb of a user) is moved from the coordinate value P1 to the coordinate value P1' on the touch-sensitive panel 220 in terms of the time stamp Tx and its two corresponding coordinate values P1 and P1' generated during the previous period and the current period; the processor 210 can know that another touch object (for example, an index finger of the user) is moved from the coordinate value P2 to the coordinate value P3' on the touch-sensitive panel 220 according to the time stamp Ty and its two corresponding coordinate values P2 and P3' generated during the previous period and the current period; and the processor 210 can know that two touch objects (for example, a middle finger and a ring finger of the user) respectively add two touch inputs on the corresponding positions of the coordinate values P2' and P4' of the touch-sensitive panel 220. From all the considerations above, it is clear that the current array Arr_Cur generated in the present invention is able to accurately determine operating gestures of the user.

What calls for special attention is that in the abovementioned step S807, the calculation of the distances that are between the coordinate values P1'-P2 and the coordinate values P1'~P4' is presented merely for describing the present invention, and in no way should be considered as a limitation of the present invention. As long as the processor 210 can determine the nearest coordinate value of the coordinate values P1'~P4' that is closet to the coordinate value P1/P2 respectively based on the coordinate values P1~P2 and P1'~P4' and accordingly decide to copy and store two time stamps of the previous array Arr_Pre into the current Arr_Cur, it is clear that various modifications of the calculation of the distances that are between the coordinate values P1~P2 and the coordinate values P1'~P4' may be made without departing from the spirit of the present invention, which also belongs to the scope of the present invention.

Otherwise, in the step S804, compared the number of the touch inputs detected by the processor 210 during the current period with that detected by the processor 210 during the previous period (that is, the number of the touch inputs recorded in the previous array Arr_Pre), the processor 210 determines that the number of the touch inputs detected during the current period does not increase (that is, the number of the touch inputs recorded in the current array Arr_Cur). At this time, go to the step S809. In the step S809, compared the number of the touch inputs detected by the processor 210 during the current period with that detected by the processor 210 during the previous period, the processor 210 is used for determining whether the number of the touch inputs detected during the current period decreases. If it is yes, go to the step S810.

Figure 9:
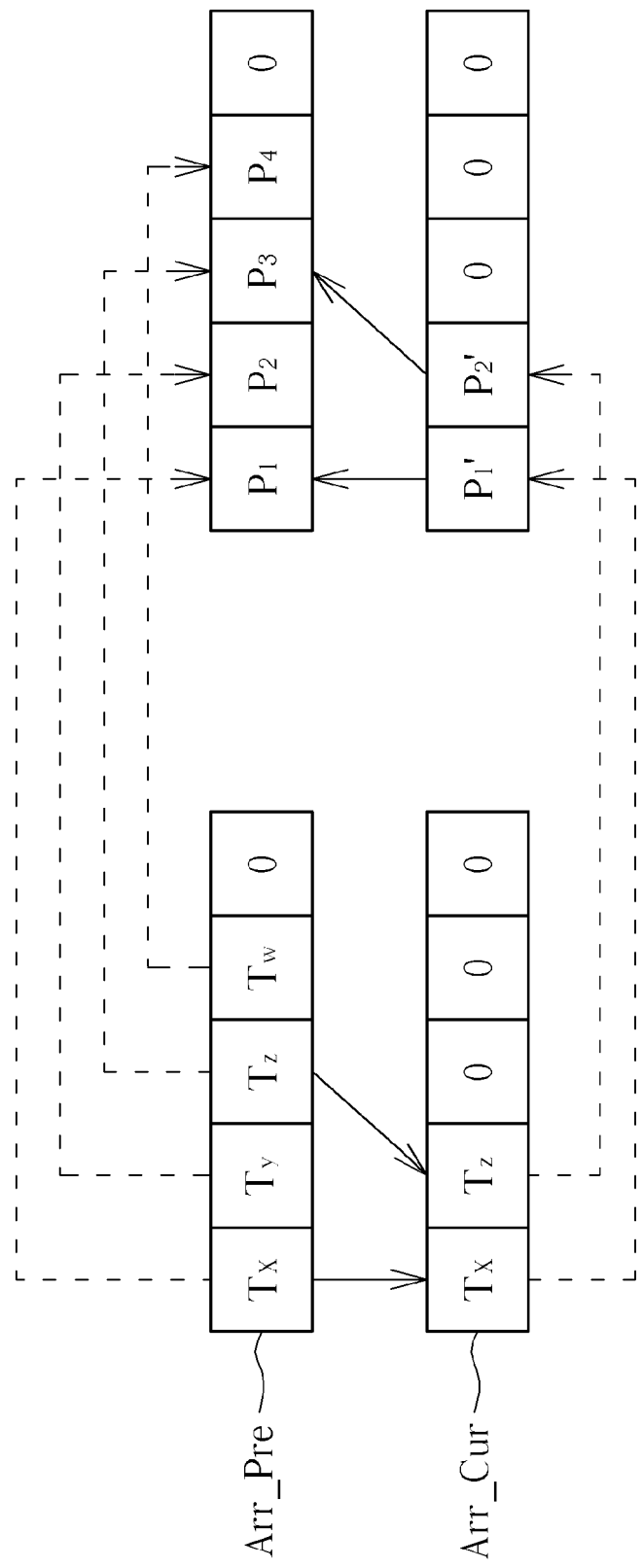
FIG. 9 is a diagram illustrating a previous array and a current array of a memory when the processor tracks the touch inputs according to another embodiment of the method shown in FIG. 6.

In the step S810, the processor 210 tracks the touch inputs in order to determine the tracks of the touch inputs. In more detail, by reference to the coordinate values recorded in previous array Arr_Pre and the current array Arr_Cur, the processor 210 is capable of determining which coordinate value (s) recorded in the current array Arr_Cur correspond(s) to the same touch object(s) (for example, a thumb of a user) of the coordinate value(s) recorded in the previous array Arr_Pre, and assigning the same identification (s) (for example, the time stamp) of the corresponding coordinate value(s) recorded in the previous array Arr_Pre to the coordinate value(s) recorded in the current array Arr_Cur. Therefore, the processor 210 can determine the track of the touch input of the same touch object according to the time stamp and its two corresponding coordinate values generated during the previous period and the current period. As an illustration, please refer to FIG. 9. FIG. 9 is a diagram illustrating a previous array and a current array of a memory when the processor tracks the touch inputs according to another embodiment of the method shown in FIG. 6. Assume that the processor 210 sequentially detects four touch inputs on the touch-sensitive panel 220 during the previous period and correspondingly generates four coordinate values $P_1$, $P_2$, P3, and P4 as well as four time stamps Tx, Ty, Tz, and Tw to be recorded in the previous array Arr_Pre of the memory 230; assume that the processor 210 sequentially detects two touch inputs on the touch-sensitive panel 220 during the current period and correspondingly generates two coordinate values P1' and P2' to be recorded in the current array Arr_Cur of the memory 230. The processor 210 first calculates the distances that are between the coordinate value P1' and these coordinate value P1, P2, P3, and P4, such that the shortest distance is found in order to determine a coordinate value in accordance with the coordinate value P1' from these coordinate values P1~P4. The processor 210 copies the corresponding time stamp of the found coordinate value from the previous array Arr_Pre to be recorded into the first position (i.e., the corresponding position of the coordinate value P1') in the current array Arr_Cur. Assume that in this embodiment, the distance between the coordinate value P1 and the coordinate value P1' is the shortest. The processor 210 accordingly determines that the touch input located at the coordinate value P1 detected during the previous period corresponds to the same touch object (for example, a thumb of a user) of the touch input located at the coordinate value P1' detected during the current period, such that the time stamp Tx corresponding to the coordinate value P1 recorded in the previous array Arr_Pre is copied and recorded into the corresponding position of the coordinate value P1' in the current array Arr_Cur. In a similar way, the processor 210 then calculates the distances that are between the coordinate value P2' and these coordinate values P2, P3, and P4, such that the shortest distance is found in order to determine a coordinate value in accordance with the coordinate value P2' from these coordinate values P2~P4. The processor 210 stores the corresponding time stamp of the found coordinate value into the second position (i.e., the corresponding position of the coordinate value P2') in the current array Arr_Cur. Assume that in this embodiment, the distance between the coordinate value P2' and the coordinate value P3 is the shortest. The processor 210 accordingly determines that the touch input located at the coordinate value P3 detected during the previous period corresponds to the same touch object (for example, an index finger of a user) of the touch input located at the coordinate value P2' detected during the current period, such that the time stamp Tz corresponding to the coordinate value P3 recorded in the previous array Arr_Pre is copied and recorded into the corresponding position of the coordinate value P2' in the current array Arr_Cur.

As a result, the processor 210 can know that a touch object (for example, a thumb of a user) is moved from the coordinate value P1 to the coordinate value P1' on the touch-sensitive panel 220 in terms of the time stamp Tx and its two corresponding coordinate values P1 and P1' generated during the previous period and the current period; the processor 210 can know that another touch object (for example, an index finger of the user) is moved from the coordinate value P3 to the coordinate value P2' on the touch-sensitive panel 220 in terms of the time stamp Ty and its two corresponding coordinate values P3 and P2' generated during the previous period and the current period; and the processor 210 can know that two touch objects (for example, a middle finger and a ring finger of the user) are respectively removed from the corresponding positions of the coordinate values P2 and P4 on the touch-sensitive panel 220. From all the considerations above, it is clear that the current array Arr_Cur generated in the present invention is able to accurately determine operating gestures of the user.

What calls for special attention is that in the abovementioned step S810, the calculation of the distances that are between the coordinate values P1~P4 and the coordinate values P1'~P2' is presented merely for describing the present invention, and in no way should be considered as limitations of the present invention. As long as the processor 210 can determine the nearest coordinate value of the coordinate values P1~P4 that is closet to the coordinate value P1'/P2' respectively based on the coordinate values P1~P4 and P1'~P2' and accordingly decide to copy and store two time stamps of the previous array Arr_Pre into the current Arr_Cur, it is clear that various modifications of the calculation of the distances that are between the coordinate values P1~P4 and the coordinate values P1'~P2' may be made without departing from the spirit of the present invention, which also belongs to the scope of the present invention.

Otherwise, in the step S809, compared the number of the touch inputs detected by the processor 210 during the current period with that detected by the processor 210 during the previous period (that is, the number of the touch inputs recorded in the previous array Arr_Pre), the processor 210 determines that the number of the touch inputs detected during the current period does not decrease (that is, the number of the touch inputs recorded in the current array Arr_Cur). At this time, go to the step S811.

Figure 10:
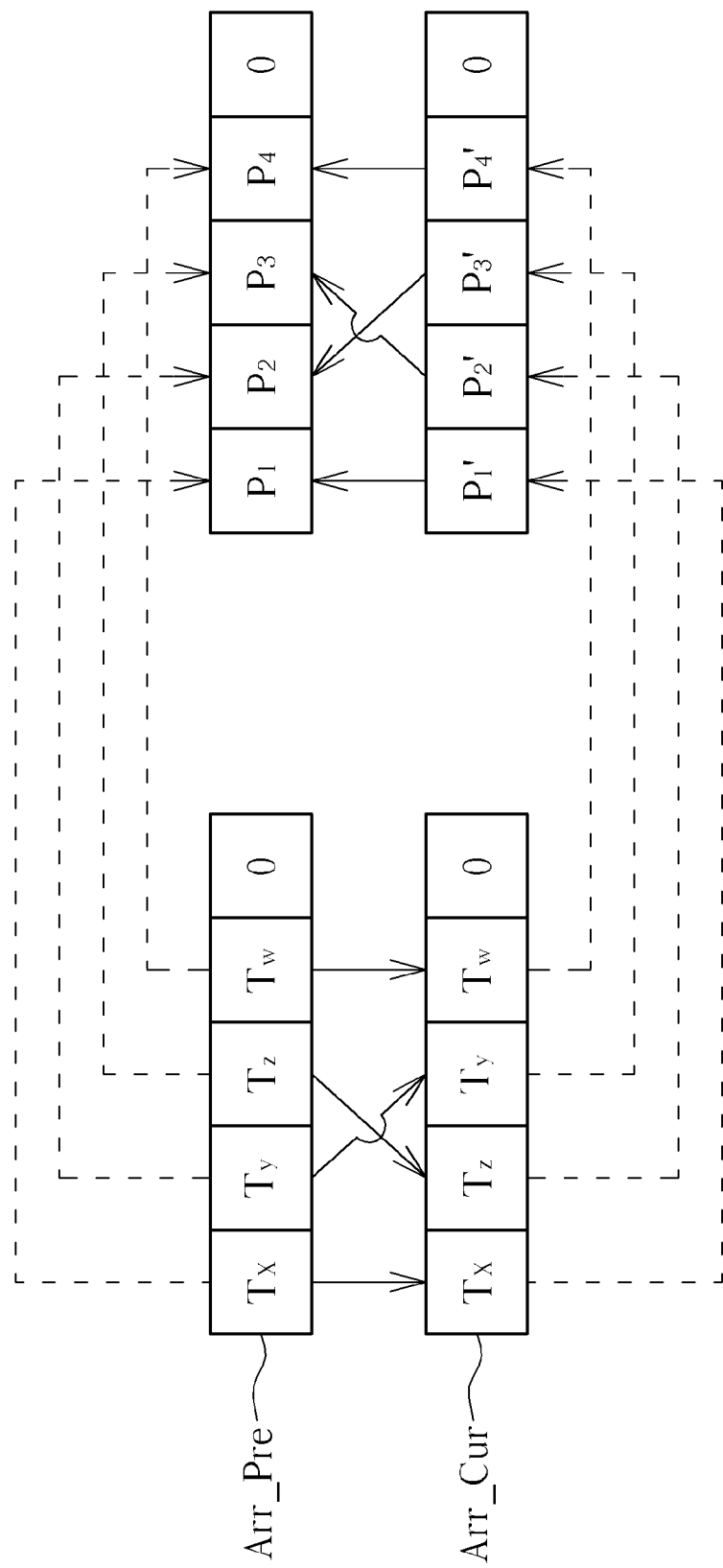
FIG. 10 is a diagram illustrating a previous array and a current array of a memory when the processor tracks the touch inputs according to another embodiment of the method shown in FIG. 6.

In the step S811, the processor 210 tracks the touch inputs in order to determine the tracks of the touch inputs. In more detail, by reference to the coordinate values recorded in previous array Arr_Pre and the current array Arr_Cur, the processor 210 is capable of determining which coordinate value (s) recorded in the current array Arr_Cur correspond(s) to the same touch object(s) (for example, a thumb of a user) of the coordinate value(s) recorded in the previous array Arr_Pre, and assigning the same identification (s) (for example, the time stamp) of the corresponding coordinate value(s) recorded in the previous array Arr_Pre to the coordinate value(s) recorded in the current array Arr_Cur. Therefore, the processor 210 can determine the track of the touch input of the same touch object in terms of the time stamp and its two corresponding coordinate values generated during the previous period and the current period. As an illustration, please refer to FIG. 10. FIG. 10 is a diagram illustrating a previous array and a current array of a memory when the processor tracks the touch inputs according to another embodiment of the method shown in FIG. 6. Assume that the processor 210 sequentially detects four touch inputs on the touch-sensitive panel 220 during the previous period and correspondingly generates four coordinate values $P_1$, $P_2$, P3, and P4 as well as four time stamps Tx, Ty, Tz, and Tw to be recorded in the previous array Arr_Pre of the memory 230; assume that the processor 210 sequentially detects four touch inputs on the touch-sensitive panel 220 during the current period and correspondingly generates four coordinate values P1', P2', P3', and P4' to be recorded in the current array Arr_Cur of the memory 230. The processor 210 first calculates the distances that are between the coordinate value P1' and these coordinate value P1, P2, P3, and P4, such that the shortest distance is found in order to determine a coordinate value in accordance with the coordinate value P1' from these coordinate values P1~P4. The processor 210 copies the corresponding time stamp of the found coordinate value from the previous array Arr_Pre to be recorded into the first position (i.e., the corresponding position of the coordinate value P1') in the current array Arr_Cur. Assume that in this embodiment, the distance between the coordinate value P1 and the coordinate value P1' is the shortest. The processor 210 accordingly determines that the touch input located at the coordinate value P1 detected during the previous period corresponds to the same touch object (for example, a thumb of a user) of the touch input located at the coordinate value P1' detected during the current period, such that the time stamp Tx corresponding to the coordinate value P1 recorded in the previous array Arr_Pre is copied and recorded into the corresponding position of the coordinate value P1' in the current array Arr_Cur, as is shown in FIG. 10. In a similar way, the processor 210 then calculates the distances that are between the coordinate value P2' and these coordinate values P2, P3, and P4, such that the shortest distance is found in order to determine a coordinate value in accordance with the coordinate value P2' from these coordinate values P2'-P4. The processor 210 stores the corresponding time stamp of the found coordinate value into the second position (i.e., the corresponding position of the coordinate value P2') in the current array Arr_Cur. Assume that in this embodiment, the distance between the coordinate value P2' and the coordinate value P3 is the shortest. The processor 210 accordingly determines that the touch input located at the coordinate value P3 detected during the previous period corresponds to the same touch object (for example, an index finger of a user) of the touch input located at the coordinate value P2' detected during the current period, such that the time stamp Tz corresponding to the coordinate value P3 recorded in the previous array Arr_Pre is copied and recorded into the corresponding position of the coordinate value P2' in the current array Arr_Cur, as is shown in FIG. 10. After that, the processor 210 calculates the distances that are between the coordinate value P3' and these coordinate value P2 and P4, such that the shortest distance is found in order to determine a coordinate value in accordance with the coordinate value P3' from these coordinate values P2 and P4. The processor 210 copies the corresponding time stamp of the found coordinate value from the previous array Arr_Pre to be recorded into the third position (i.e., the corresponding position of the coordinate value P3') in the current array Arr_Cur. Assume that in this embodiment, the distance between the coordinate value P3' and the coordinate value P2 is the shortest. The processor 210 accordingly determines that the touch input located at the coordinate value P2 detected during the previous period corresponds to the same touch object (for example, a middle finger of a user) of the touch input located at the coordinate value P3' detected during the current period, such that the time stamp Ty corresponding to the coordinate value P2 recorded in the previous array Arr_Pre is copied and recorded into the corresponding position of the coordinate value P3' in the current array Arr_Cur, as is shown in FIG. 10. Finally, the processor 210 can directly determine that the touch input located at the coordinate value P4 detected during the previous period corresponds to the same touch object (for example, a ring finger of a user) of the touch input located at the coordinate value P4' detected during the current period based on the aforementioned determining results, such that the time stamp Tw corresponding to the coordinate value P4 recorded in the previous array Arr_Pre is copied and recorded into the corresponding position of the coordinate value P4' in the current array Arr_Cur, as is shown in FIG. 10.

As a result, the processor 210 can know that a touch object (for example, a thumb of a user) is moved from the coordinate value P1 to the coordinate value P1' on the touch-sensitive panel 220 in terms of the time stamp Tx and its two corresponding coordinate values P1 and P1' generated during the previous period and the current period; the processor 210 can know that another touch object (for example, an index finger of the user) is moved from the coordinate value P3 to the coordinate value P2' on the touch-sensitive panel 220 in terms of the time stamp Tz and its two corresponding coordinate values P3 and P2' generated during the previous period and the current period; the processor 210 can know that another touch object (for example, a middle finger of the user) is moved from the coordinate value P2 to the coordinate value P3' on the touch-sensitive panel 220 in terms of the time stamp Ty and its two corresponding coordinate values P2 and P3' generated during the previous period and the current period; and the processor 210 can know that another touch object (for example, a ring finger of the user) is moved from the coordinate value P4 to the coordinate value P4' on the touch-sensitive panel 220 in terms of the time stamp Tw and its two corresponding coordinate values P4 and P4' generated during the previous period and the current period. From all the considerations above, it is clear that the current array Arr_Cur generated in the present invention is able to accurately determine operating gestures of the user.

What calls for special attention is that the abovementioned calculation of the distances that are between the coordinate values P1~P4 and the coordinate values P1'~P4' is presented merely for describing the present invention, and in no way should be considered as limitations of the present invention. As long as the processor 210 can determine the nearest coordinate value of the coordinate values P1~P4 that is closet to the coordinate values P1'~P4' respectively based on the coordinate values P1~P4 and P1'~P4', and accordingly decide to copy and store the time stamps of the previous array Arr_Pre into the current Arr_Cur, it is clear that various modifications of the calculation of the distances that are between the coordinate values P1~P4 and the coordinate values P1'~P4' may be made without departing from the spirit of the present invention, which also belongs to the scope of the present invention. As an illustration, continued from the abovementioned example, the processor 210 can calculate the distances that are between the coordinate value P1 and these coordinate values P1', P2', P3', and P4' respectively, such that the shortest distance is found in order to determine a coordinate value in accordance with the coordinate value P1 from these coordinate values P1'~P4'. The processor 210 copies the corresponding time stamp of the coordinate value P1 from the previous array Arr_Pre to be recorded into a corresponding position of the found coordinate value in the current array Arr_Cur. Assume that in this embodiment, the distance between the coordinate value P1 and the coordinate value P1' is the shortest. The processor 210 accordingly determines that the touch input located at the coordinate value P1 detected during the previous period corresponds to the same touch object (for example, a thumb of a user) of the touch input located at the coordinate value P1' detected during the current period, such that the time stamp Tx corresponding to the coordinate value P1 recorded in the previous array Arr_Pre is copied and recorded into the corresponding position of the coordinate value P1' in the current array Arr_Cur.

What calls for special attention is that in the descriptions related to the abovementioned steps S807, S810, and S811, the time stamps are used as the identifications recorded in the previous array, and a part or all parts of the time stamps in the previous array are directly copied to be a part or all parts of the time stamps in the current array. However, in other embodiments of the present invention, the identifications recorded in the previous array are not limited to be implemented by the time stamps. Additionally, a part or all parts of the identifications in the current array can be generated according to a part or all part of the identifications in the previous array. Take FIG. 10 as an illustration, the first identification in the current array is not limited to be Tx, and it can be set as Tx' based on the time stamp Tx of the previous array. In other words, as long as the identification Tx' and the identification Tx can be used for identifying to the same touch input by reference to a designated rule, it may work.

What's more, the present invention further provides a computer program product, which is used for executing the control method of the aforementioned electronic apparatus. Basically, this computer program product is composed of several code segments, such as code segments for building organization charts, code segments for sign-off forms, code segments for settings, and code segments for deployments. In addition, after these code segments are loaded into the electronic apparatus (e.g. the electronic apparatus 200) and are executed, the steps and features of the control method for the abovementioned electronic apparatus can be implemented.

Those skilled in the art will readily observe that numerous modifications and alterations of the device and method may be made while retaining the teachings of the invention.

What is claimed is:

1. A method for detecting tracks of touch inputs on touch-sensitive panel, applied to an electronic apparatus having a touch-sensitive panel, the method comprising:
   during a first period, detecting M touch positions of M touch inputs on the touch-sensitive panel;
   during a second period, detecting N touch positions of N touch inputs on the touch-sensitive panel, wherein M and N are positive integers and M is less than or equal to N;
   selecting a specific touch input from the M touch inputs, wherein the specific touch input corresponds to a specific touch position of the M touch positions, and the specific touch position corresponds to a specific identification; and
   determining a track of the specific touch input on the touch-sensitive panel according to a plurality of distances that are between the specific touch position and the N touch positions respectively;
   wherein the step of determining the track of the specific touch input comprises:
      comparing the distances so as to determine a nearest touch position of the N touch positions that is closest to the specific touch position;
      setting the nearest touch position to correspond to the specific identification as well; and
      determining that the specific touch input is moved from the specific touch position to the nearest touch position on the touch-sensitive panel according to the specific identification.

2. The method of claim 1, wherein the first period is earlier than the second period.

3. The method of claim 2, wherein M is less than N, and the method further comprises the following steps:
   sequentially determining tracks of the M touch inputs;
   identifying (N-M) touch positions of the N touch positions that not corresponding to any one of the M touch inputs, wherein the (N-M) touch positions respectively correspond to (N-M) touch inputs of the N touch inputs; and
   determining that the (N-M) touch inputs are newly added at the (N-M) touch positions on the touch-sensitive panel respectively.

4. The method of claim 3, further comprising:
   setting the (N-M) touch positions respectively to correspond to (N-M) identification.

5. The method of claim 1, wherein the specific identification is a time stamp that is related to the time the specific touch input is newly added on the touch-sensitive panel.

6. The method of claim 1, wherein the first period is later than the second period.

7. The method of claim 6, wherein M is less than N, and the method further comprises the following steps:
   sequentially determining tracks of the M touch inputs;
   identifying (N-M) touch positions of the N touch positions that not corresponding to any one of the M touch inputs, wherein the (N-M) touch positions respectively correspond to (N-M) touch inputs of the N touch inputs; and
   determining that the (N-M) touch inputs are removed from the (N-M) touch positions on the touch-sensitive panel respectively.

8. An electronic apparatus, comprising:
   a touch-sensitive panel; and
   a processor, coupled to the touch-sensitive panel, for detecting M touch positions of M touch inputs on the touch-sensitive panel during a first period, and for detecting N touch positions of N touch inputs on the touch-sensitive panel during a second period, wherein M and N are positive integers and M is less than or equal to N; the processor is further used for selecting a specific touch input from the M touch inputs, wherein the specific touch input corresponds to a specific touch position of the M touch positions, and the specific touch position corresponds to a specific identification; and the processor is further used for determining a track of the specific touch input on the touch-sensitive panel according to a plurality of distances that are between the specific touch position and the N touch positions respectively; wherein the processor is further used for comparing the distances so as to determine a nearest touch position of the N touch positions that is closest to the specific touch position, setting the nearest touch position to correspond to the specific identification as well, and determining that the specific touch input is moved from the specific touch position to the nearest touch position on the touch-sensitive panel according to the specific identification.

9. The electronic apparatus of claim 8, wherein the first period is earlier than the second period.

10. The electronic apparatus of claim 9, wherein M is less than N; and the processor is further used for sequentially determining tracks of the M touch inputs, for identifying (N-M) touch positions of the N touch positions that not corresponding to any one of the M touch inputs, wherein the (N-M) touch positions respectively correspond to (N-M)

touch inputs of the N touch inputs, and for determining that the (N-M) touch inputs are newly added at the (N-M) touch positions on the touch-sensitive panel respectively.

11. The electronic apparatus of claim 10, wherein the processor is further used for setting the (N-M) touch positions respectively to correspond to (N-M) identification.

12. The electronic apparatus of claim 8, wherein the specific identification is a time stamp that is related to the time the specific touch input is newly added on the touch-sensitive panel.

13. The electronic apparatus of claim 8, wherein the first period is later than the second period.

14. The electronic apparatus of claim 13, wherein M is less than N; and the processor is further used for sequentially determining tracks of the M touch inputs, for identifying (N-M) touch positions of the N touch positions that not corresponding to any one of the M touch inputs, wherein the (N-M) touch positions respectively correspond to (N-M) touch inputs of the N touch inputs, and for determining that the (N-M) touch inputs are removed from the (N-M) touch positions on the touch-sensitive panel respectively.

15. A non-transitory computer program product, having program instructions used for executing the following steps:
    during a first period, detecting M touch positions of M touch inputs on the touch-sensitive panel;
    during a second period, detecting N touch positions of N touch inputs on the touch-sensitive panel, wherein M and N are positive integers and M is less than or equal to N;
    selecting a specific touch input from the M touch inputs, wherein the specific touch input corresponds to a specific touch position of the M touch positions, and the specific touch position corresponds to a specific identification; and
    determining a track of the specific touch input on the touch-sensitive panel according to a plurality of distances that are between the specific touch position and the N touch positions respectively;
    wherein the step of determining the track of the specific touch input comprises:
        comparing the distances so as to determine a nearest touch position of the N touch positions that is closest to the specific touch position;
        setting the nearest touch position to correspond to the specific) identification as well; and
        determining that the specific touch input is moved from the specific touch position to the nearest touch position on the touch-sensitive panel according to the specific identification.

16. An apparatus for detecting tracks of touch inputs on a touch-sensitive panel, comprising:
    a first means, for detecting M touch positions of M touch inputs on the touch-sensitive panel during a first period, and for detecting N touch positions of N touch inputs on the touch-sensitive panel during a second) period, wherein M and N are positive integers and M is less than or equal to N;
    a second means, for selecting a specific touch input from the M touch inputs, wherein the specific touch input corresponds to a specific touch position of the M touch positions, and the specific touch position corresponds to a specific identification; and
    a third means, for determining a track of the specific touch input on the touch-sensitive panel according to a plurality of distances that are between the specific touch position and the N touch positions respectively; and the third means is further used for comparing the distances so as to) determine a nearest touch position of the N touch positions that is closest to the specific touch position, setting the nearest touch position to correspond to the specific identification as well, and determining that the specific touch input is moved from the specific touch position to the nearest touch position on the touch-sensitive panel according to the specific identification.

* * * * *